Aug. 23, 1960   E. H. ANDERSON   2,949,678
VEHICLE DRIER NOZZLE WITH SELF-POSITIONING MOUNT
Filed Sept. 21, 1956   2 Sheets-Sheet 1
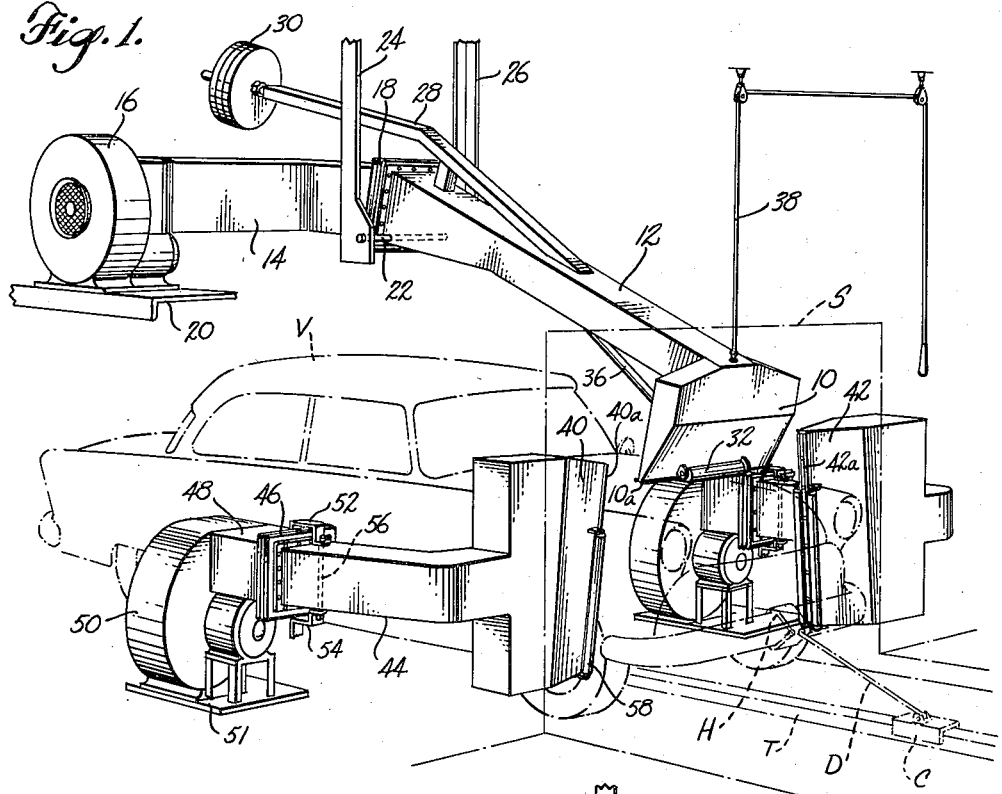
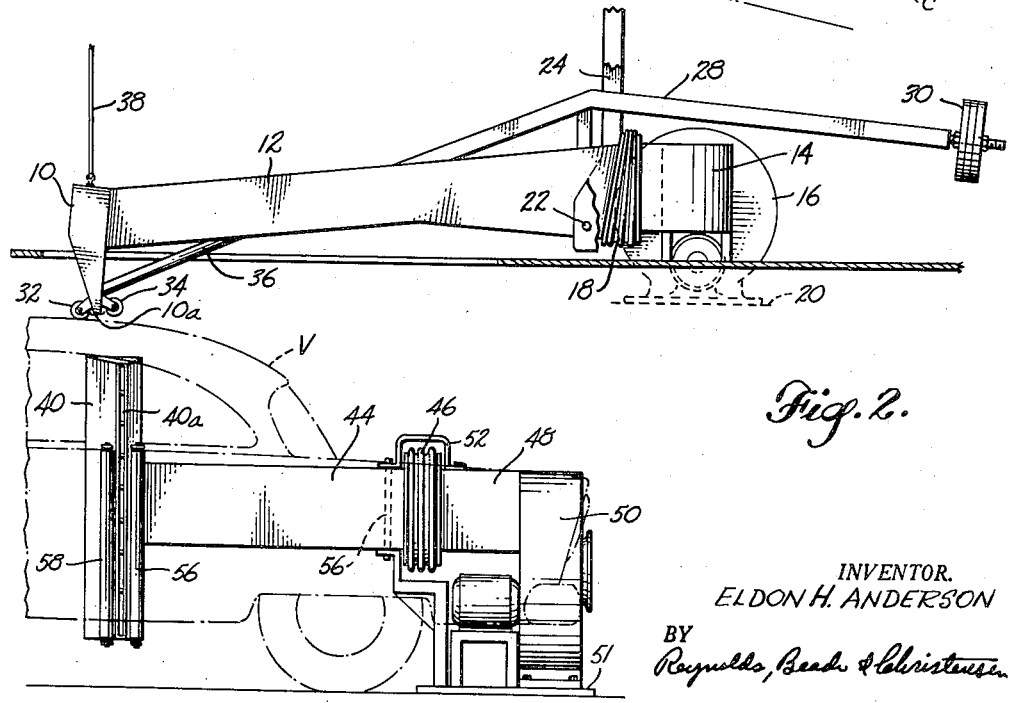
INVENTOR.
ELDON H. ANDERSON
BY
Reynolds, Beeche & Christensen
ATTORNEYS

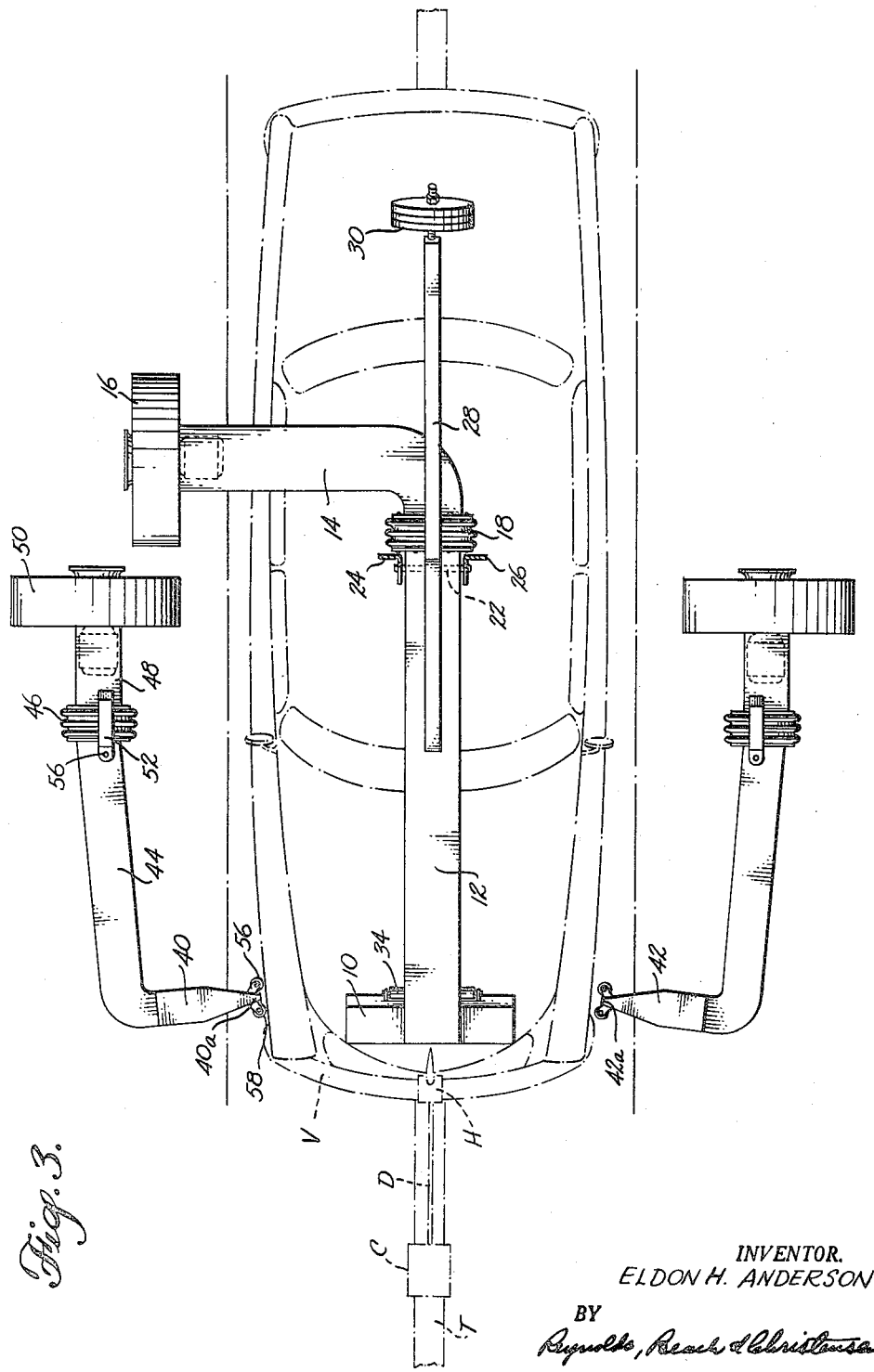

United States Patent Office 2,949,678
Patented Aug. 23, 1960

2,949,678

VEHICLE DRIER NOZZLE WITH SELF-POSITIONING MOUNT

Eldon H. Anderson, 2453 S.W. 120th, Seattle, Wash.

Filed Sept. 21, 1956, Ser. No. 611,195

5 Claims. (Cl. 34—105)

This invention relates to improvements in drying apparatus for automobile washing establishments, and more particularly to improvements in warm air blower devices used therein. The invention is herein illustratively described by reference to the presently preferred form thereof; however, it will be recognized that certain changes and modifications therein with respect to details may be made without departing from the essential features involved.

To be most effective, a drier nozzle directing a blast of warm air against the side or top of a wet automobile should be positioned as closely to the adjacent surface of the vehicle as possible. It is therefore necessary for the nozzle to be capable of moving in and out in relation to the centerline of the vehicle as the latter is advanced along its track past the drying station. Such accommodative movement of the nozzle allows for changing surface contours of the vehicles, for vehicles of different widths and heights and for momentary nozzle retraction in order to clear side-view mirrors and other projections.

It is considered uneconomical and impractical to position these drier nozzles manually. In establishments having drier nozzles on each side of the track and one above the track, three men would be required for that type of operation. Moreover, such nozzles are inherently large and bulky and their reactionary force produced by air discharge quite large, making it difficult to move them manually in the required manner, especially for a period of time as long as the normal working day. It is therefore important to provide self-positioning mounts for these nozzles.

The general object of this invention is to provide a simple, reliable and rugged self-positioning drier nozzle means for vehicle washing establishments and the like.

Another object is the provision of such a selfpositioning drier nozzle which, despite the large discharge force created in its operation, is delicately balanced for automatic retraction by light contact of its guide element with a projection or a changing surface contour on the vehicle.

More specifically, it is an object to provide self-positioning nozzle apparatus harnessing the force of the blower output for balancing out the nozzle discharge thrust, preferably with sufficient excess to urge the nozzle continuously but gently toward close proximity to the adjacent general surface of the vehicle.

A related object is a self-positioning nozzle means which will perform consistently and reliably throughout its entire range of movement and substantially independently of variations in nozzle air velocity affecting the discharge thrust of the nozzle, caused for example by fluctuations in blower motor energizing voltage.

In carrying out these objects the invention provides, in combination with a surface-guided drier nozzle having a guide element thereon contacting the vehicle surface, means supporting the nozzle to permit movement thereof transversely to the track of the vehicles, and a blower connected to the nozzle, means harnessing the force of the blower and acting on the movable nozzle in a sense to balance the discharge reaction force of the nozzle, and preferably slightly overbalance the latter force in order to urge such nozzle continuously and gently in the direction toward the adjacent side of the vehicle while permitting outward yielding thereof in response to contact of the guide element with a projection or changing surface contour on the vehicle. In its preferred form the blower force harnessing means comprises a specially located pivotal mount for the nozzle feed duct, said mount permitting the required nozzle movement transverse to the length of the vehicle and being characterized by the location of the duct pivot axis at a position offset from the transverse center of balance of the duct by a predetermined amount in a direction generally corresponding to that of the torque-producing component of nozzle discharge force. The amount of such offset determines the force balanced against nozzle discharge force. It will be evident that since both of these opposing dynamic forces are directly dependent on blower discharge velocity their balance remains essentially unimpaired by blower speed variations and by changes in position of the nozzle throughout its entire range of movement transversely of the track of the vehicle. In the case of a top drier nozzle, static balance is also provided, as by counterweighting the pivoted nozzle head. In the case of side drier nozzles mounted to pivot on a vertical axis, static balancing to compensate for nozzle weight is not necessary.

These and other features, objects and advantages of the invention will become more fully evident from the following description thereof by reference to the accompanying drawing illustrating the preferred embodiment thereof.

Figure 1 is a perspective view of the novel drying apparatus comprising nozzle units installed on both sides of the vehicle track and above the track.

Figure 2 is a side elevation view of the same.

Figure 3 is a plan view thereof.

In the illustrated arrangement the vehicle V is advanced along the track T by a motor driven conveyor element C connected by a drawbar D and clip H to the front bumper. The details of this or other suitable arrangements for advancing the vehicle along the desired track through the car washing establishment may be conventional and may vary, constituting no essential part of the present invention. Before arriving at the drying station S, the washed vehicle is quite wet. The drying apparatus must be capable of effecting substantially complete drying of the exterior of the vehicle during the short period during which it advances past the drier nozzles so that little or no moisture remains to be rubbed off manually in the final polishing operation.

The top drier nozzle 10 has an elongated narrow discharge outlet 10a extending in a horizontal line transverse to the length of the track T so as to span the major portion of the width of the standard automobile top. This nozzle is directed generally downwardly and is rigidly mounted on the end of the elongated generally horizontal nozzle feed duct 12 which extends in generally perpendicular relationship to the nozzle and rearwardly therefrom in relation to the direction of movement of the vehicle along the track T. The specific shapes of the duct 12 and of the nozzle 10 connected thereto are not critical and may vary in accordance with preference or design requirements. The nozzle feed duct 12 is in turn connected to the discharge duct 14 of the blower 16 through a flexible bellows type duct joint 18 to permit swinging of the feed duct 12 in a vertical plane relative to the blower discharge duct 14. The latter duct is rigidly connected to the blower which in turn is mounted in stationary position on the supporting platform 20.

Near its end connected to the blower discharge duct, the nozzle feed duct 12 is supported pivotally on a transverse shaft 22 which extends parallel to the nozzle discharge orifice 10a, that is in a horizontal direction transverse to the line of the track T. The pivot shaft is supported in this position by suitable means such as the stationary hanger bars 24 and 26 located adjacent opposite sides of the feed duct. The static weight of the nozzle head including the nozzle proper 10 and the feed duct 12 is counterbalanced by a weighted cantilever arm 28 secured to the feed duct 12 and projecting rearwardly therefrom across the vertical plane containing the axis of pivot shaft 22. Counterweights 30 are carried by the projecting end of the arm 28 and are adjustable in position lengthwise thereof in order to achieve an accurate static balance so that when the blower is turned off the nozzle will not drop heavily.

As shown in Figures 1 and 2, the pivot shaft 22 is positioned relative to the feed duct 12 materially below the generally horizontal longitudinal mid-plane of such duct. The amount of offset of the pivot axis relative to the mid-plane, or more accurately relative to the effective center of the duct from the standpoint of balance of the forces of the blower directed against the duct interior, insofar as these forces produce torque tending to swing the nozzle assembly about its pivot axis, is so selected that the discharge force of the nozzle tending to swing it upwardly about the pivot axis is preferably somewhat more than balanced out by the opposing force created by the offsetting of the pivot axis as described. It will now be apparent that the basic balancing out of the nozzle's discharge force in this embodiment of the invention involves physical principles which are readily understood. Those principles are perhaps most easily and directly expressed in terms of the relationship of effective areas of the nozzle orifice at the exit and the nozzle duct in a transverse plane containing the duct's pivot axis, together with the respective effective air pressures in those planes and the effective moment arms at which the area pressures act about the nozzle pivot. Thus the torque due to the nozzle discharge force tending to urge the nozzle away from the vehicle is substantially the pressure in the orifice multiplied by the nozzle orifice area over which the pressure acts, multiplied by the distance between the center of that area and the nozzle pivot axis. The opposing or balancing torque is substantially the pressure in the transverse pivot plane of the nozzle multiplied by the area over which that pressure acts and the effective distance between the effective center of that pressure and the pivot axis. If the pivot plane is medially located in the transverse duct plane the latter torque is obviously zero. By progressively shifting the pivot axis in such plane away from that center of pressure in the proper direction, the offsetting torque increases and a location is eventually reached at which the two torques balance each other. The final location selected may obviously be established by calculation or by empirical methods, whichever may be more convenient in a given case. Actually it is preferred that the location be selected to provide a slight overbalancing of the nozzle discharge torque such that there is produced a net downward force on the nozzle which urges it gently toward proximity with the vehicle top. If a precise balance of these dynamic air forces is established, other means such as weighting of the nozzle or light spring action will be required to urge the nozzle yieldably toward proximity with the vehicle. The important factor is that this balancing of dynamic forces or torques of the nozzle remains substantially constant despite any tendency for the blower to change speed as a result of power supply voltage fluctuations or other causes. The nozzle is therefore both statically and dynamically balanced, and is self-positioning with respect to the vehicle.

Guide rollers 32 and 34, of rubber or other soft material, are mounted along the front and rear edges of the nozzle orifice 10a to extend lengthwise of such orifice and protrude downwardly therefrom sufficiently to contact the vehicle surface and prevent scraping of the orifice edges against such surface. A central longitudinally extending bumper or guide rod 36 connected at its forward end to the nozzle just above the roller 34 extends at an incline therefrom rearwardly to the lower face of the feed duct 12. This bumper rod, also covered with rubber or like soft material, further insures retraction of the nozzle on approach thereof to a projection on the vehicle, so as to avoid damage thereto.

A draw cord 38 is provided if desired for lifting the nozzle 10 manually from the path of the vehicle in case of convertible top vehicles, the fabric of which, if weak with age, might be torn or split by the force of air discharging from the nozzle.

In addition to the top drier nozzle the washing establishment also preferably includes side drier nozzles 40 and 42 respectively positioned along opposite sides of the track T. These nozzles have inwardly directed elongated orifices 40a and 42a, respectively, which extend substantially vertically with a slight upward and inward incline corresponding to the general side surface inclination of most automobiles. Only the nozzle 40 and its associated mount and blower apparatus need be described inasmuch as the nozzle 42 and its associated apparatus are or may be identical therewith.

The nozzle 40 is supported by the nozzle feed duct 44 connected through a flexible bellows type coupling 46 to the blower discharge duct 48. The latter is supplied with air under pressure from and is mechanically supported by the blower 50 stationarily mounted on a base plate 51. The blower duct 48 serves as the support for top and bottom mounting arms 52 and 54 carrying the vertical pivot shaft 56 by which the nozzle feed duct 44 carrying nozzle 40 is supported. The pivot shaft 56 is materially offset from the center of balance of the feed duct 44 with respect to the forces of the nozzle discharge entering such duct, on the side toward the nozzle orifice 40a. The amount of offset is selected so as to balance out the opposing thrust created by the nozzle discharge and preferably provide a net torque which urges the nozzle gently toward the adjacent side of the vehicle. The principle of the offset pivot is similar to that employed in the case of the top drier nozzle. However, in the case of the side drier nozzle 40 no static balancing means, such as counterweights or the like, are required inasmuch as the side nozzles may be pivoted on a vertical axis as shown.

Front and rear guide rolls 58 and 60 are mounted adjacent the corresponding edges of the orifice 40a in order to maintain such edges out of contact with the surfaces of the vehicle. Alternative or additional guide means may also be provided on these nozzles in order to facilitate guidance of the nozzle along the changing contour of the vehicle surface and to deflect the nozzle outwardly in response to contact of such guide means with projecting elements on the vehicle.

It will therefore be evident that the invention provides novel self-positioning drier nozzle means wherein the balance of dynamic air forces of the nozzles is maintained approximately constant throughout variations in lower speed and throughout the entire range of nozzle movement. Such apparatus is therefore superior to positioning springs or other devices which vary in their force of reaction as a function of displacement, or which are incapable of taking into account variations in blower speed directly affecting the thrust exerted on the nozzle by the discharge thereof. It will also be recognized that the present invention comprises a simple, reliable and rugged means for accomplishing the desired results. However, it will be evident that the invention is not necessarily limited to the illustrated details, but may be extended to equivalent arrangements utilizing the principle of harnessing blower discharge force to balance nozzle discharge force in a self-positioning drier nozzle means.

I claim as my invention:

1. In a vehicle washing establishment, drier nozzle means comprising a nozzle having a discharge orifice therein adapted to be directed toward the surface of a vehicle to be dried, an elongated nozzle feed duct connected at one end to said nozzle in generally transverse relationship to the direction of discharge of said nozzle orifice, a blower, and flexible joint means connecting the opposite end of said nozzle feed duct to said blower to receive the blower discharge for conveying the same to said nozzle, said flexible joint means defining a pivot axis for said nozzle feed duct which is generally mutually perpendicular to the extent of said nozzle feed duct and to the direction of discharge of said nozzle orifice, said pivot axis being offset relative to the effective transverse center of said feed duct in the sense corresponding to the direction of discharge from said nozzle orifice, thereby to develop torque from the discharge of said blower into said feed duct which substantially balances out the opposing reaction torque exerted thereon by the nozzle discharge.

2. In a vehicle washing establishment, the combination comprising means forming a track for progressive advancement of vehicles, drier nozzles stationed at respectively opposite sides of said track and directed inwardly toward a vehicle advancing along the same, a top drier nozzle stationed above said track and directed downwardly toward a vehicle advancing along the same, elongated nozzle feed ducts connected at one end to the respective nozzles and extending therefrom generally parallel to the extent of said track, blower means connected to said nozzle feed ducts to produce a discharge from each of said nozzles giving rise to reaction forces tending to urge the same away from the vehicle being dried thereby, and means substantially balancing out said reaction forces comprising means pivotally supporting the respective feed ducts at the opposite ends thereof to permit pivoting of said ducts about axes which are substantially mutually perpendicular to the direction of extent of the respective feed ducts and the direction of discharge of the respective nozzles, said pivot axes being offset from the respective duct centers to the nozzle side of the ducts by an amount substantially balancing out the nozzle reaction forces.

3. The combination defined in claim 2, wherein the amount of offset of the pivot axes of the feed ducts produces net forces urging the respective nozzles gently toward the vehicle, and counterweight means connected to the top drier nozzle substantially counterbalancing the weight thereof statically.

4. In an article washing and drying establishment, the combination comprising means forming a track and adapted to advance articles to be dried progressively along the line of said track past a drying station wherein such articles as thus advanced have side surfaces which are at varying distances transversely from the line of the track, a stationary blower, a drier nozzle, means movably mounting said drier nozzle at said drying station directed toward said sides of the advancing articles, said mounting means permitting free movement of said nozzle transversely to the line of the track, toward and from such articles passing said station, thereby to permit the nozzle to remain in close proximity to and follow along such surfaces despite variations in the distance thereof transversely from the line of the track, said mounting means comprising an elongated nozzle feed duct extending generally parallel to the line of the track and connected at one end to the nozzle in generally transverse relationship therewith, and further comprising flexible joint means connecting the opposite end of the feed duct to the blower to receive the blower discharge for conducting the same to the nozzle, said flexible joint means defining a duct pivot axis which is generally mutually perpendicular to the extent of the feed duct and to the direction of discharge from the nozzle and which is offset relative to the effective transverse center of the duct in the sense corresponding to the direction of discharge from the nozzle, whereby compensating torque is generated in opposition to the torque produced by nozzle discharge reaction force.

5. The combination defined in claim 4 wherein the amount of offset is selected to produce compensating torque which slightly exceeds the nozzle reaction force torque.

References Cited in the file of this patent

UNITED STATES PATENTS

| | | |
|---|---|---|
| 1,697,879 | Olson | Jan. 8, 1929 |
| 2,132,303 | Lathrop | Oct. 4, 1938 |
| 2,440,157 | Rosseau | Apr. 20, 1948 |
| 2,448,834 | Rosseau | Sept. 8, 1948 |